US008822574B2

(12) United States Patent
Gunschera et al.

(10) Patent No.: US 8,822,574 B2
(45) Date of Patent: Sep. 2, 2014

(54) WOOD MATERIAL PRODUCT AND METHOD FOR THE PRODUCTION THEREOF

(75) Inventors: Jan Gunschera, Meinersen-Paese (DE); Volker Thole, Braunschweig (DE); Doreen Markewitz, Braunschweig (DE); Katrin Bokelmann, Wuerzburg (DE); Thangaraj Selvam, Nürnberg (DE); Annett Halbhuber, Scheinfeld (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/321,300

(22) PCT Filed: Apr. 30, 2010

(86) PCT No.: PCT/EP2010/002651
§ 371 (c)(1),
(2), (4) Date: Nov. 18, 2011

(87) PCT Pub. No.: WO2010/136106
PCT Pub. Date: Dec. 2, 2010

(65) Prior Publication Data
US 2012/0108707 A1 May 3, 2012

(30) Foreign Application Priority Data
May 28, 2009 (DE) .......... 10 2009 023 643

(51) Int. Cl.
C08L 97/02 (2006.01)
B27N 1/00 (2006.01)

(52) U.S. Cl.
CPC ............... B27N 1/003 (2013.01)
USPC ............... 524/13; 423/239.2; 423/700

(58) Field of Classification Search
USPC ............... 524/13; 423/700, 239.2
See application file for complete search history.

(56) References Cited

U.S. PATENT DOCUMENTS

| 4,409,293 | A | * | 10/1983 | Williams | 428/524 |
| 5,432,000 | A | * | 7/1995 | Young et al. | 428/372 |
| 6,596,909 | B2 | * | 7/2003 | Nishijima et al. | 568/917 |
| 7,645,527 | B2 | * | 1/2010 | Hummel et al. | 428/703 |
| 2003/0008130 | A1 | * | 1/2003 | Kaneko | 428/326 |
| 2004/0138402 | A1 | * | 7/2004 | Thiele et al. | 528/74.5 |
| 2007/0227351 | A1 | * | 10/2007 | Garcia-Martinez | 95/90 |
| 2008/0246177 | A1 | * | 10/2008 | Baus et al. | 264/128 |
| 2008/0250741 | A1 | * | 10/2008 | Bennett et al. | 52/506.01 |
| 2012/0195845 | A1 | * | 8/2012 | Hirukawa | 424/76.2 |

FOREIGN PATENT DOCUMENTS

| DE | 39 43 488 | 3/1991 |
| DE | 197 04 525 | 8/1997 |
| DE | 10 2004 032 905 | 9/2005 |
| DE | 10 2006 057 566 | 5/2008 |
| EP | 1 900 788 | 11/2007 |
| JP | 10-286807 | 10/1998 |
| JP | 2003-25310 | 1/2003 |
| JP | 2003-245910 | 2/2003 |
| WO | WO 2006/069961 | 7/2006 |

OTHER PUBLICATIONS

English-language machine translation of Japanese-language patent document JP2003245910. Translation performed on the JPO website on Jan. 16, 2013, at 01:15:39 JST.*
Matsuo, Y., et al., "Removal of formaldehyde from gas phase by silylated graphite oxide containing amino groups," Carbon, 2008, 46, 1162 and 1163.*
Kmec, S., et al., "Zeolite as a filler of UF resin for lower formaldehyde emission from plywood," Annals of Warsaw University of Life Sciences, Forestry and Wood Technology, No. 70, 2010, 161-165.*
Ragauskas, J., "Fast Curing of Composite Wood Products," Technical Report, USDOE Office of Industrial Technologies, 2006.*
Kim, S., et al. "Physical-mechanical properties and formaldehyde/TVOC emission of particleboards with volcanic pozzolan," Mokchae Konghak, 2007, 35, 39-50.*
Lehmann, W. F., "Wood-based composite and laminates," Kirk-Othmer Encyclopedia of Chemical Technology, published online 2000, 1-38.*

* cited by examiner

Primary Examiner — Liam J Heincer
Assistant Examiner — Nicholas Hill
(74) Attorney, Agent, or Firm — Whitham Curtis Christofferson & Cook, PC

(57) ABSTRACT

The invention relates to a wood material product and a method for producing wood material products from particles containing lignocellulose and adhesives containing formaldehydes, which are intermixed and fed to a forming process after mixing. A zeolite is added to the mixture of adhesives and particles containing lignocellulose.

21 Claims, No Drawings

WOOD MATERIAL PRODUCT AND METHOD FOR THE PRODUCTION THEREOF

A method is concerned for producing woodbase products from lignocellulosic particles and formaldehydic adhesives, which are mixed together and subsequently subjected to a shaping process. The invention likewise concerns a woodbase product as such.

Woodbase materials are a group of materials formed from comminuted pieces of wood by addition of adhesives. The pieces of wood are specifically produced by machines where the active elements are cutting or by machines where the active elements are non-cutting. Chippers are examples of machines where the active elements are cutting, while mills are examples of machines where the active elements are non-cutting. It is likewise possible to use coproducts from the working or processing of wood. In addition to the various wood raw materials, other annual and perennial plants can also be used to produce woodbase materials. The processes for producing the comminuted pieces of wood or pieces of annual and perennial plants, the so-called lignocellulosic particles, and also the requisite separation processes to remove unwanted constituents are selectable according to plant type.

Adding the adhesive resin or resins takes place either after the step of drying the particles or, as in the production of specific fiberboards, e.g., MDF, immediately after the fiber production step before the step of drying the particles. The web formed of the resinated particles or fibers is hot pressed to the desired target raw density. The heat from the hot press causes the adhesive resin to cure. This results in a solid composite material having sufficient mechanical stability and moisture resistance for the particular field of use.

An important field of use for woodbase materials is in woodbase panels, which are produced in large volumes. Woodbase panels are primarily used in furniture making and building construction. In addition to a panel press, woodbase materials can also be formed into other shapes, if desired.

In principle, any sticking and binding organic and inorganic materials can be used as adhesive or binder. The raw materials for organic adhesives are based almost exclusively on petrochemical resources. Adhesives on a vegetable or animal basis have hitherto been unable to achieve any notable industrial significance, only adhesives with the natural polyphenol "tannin" have hitherto been used on an industrial scale. Vegetable carbohydrates and animal and plant protein materials are in principle suitable for use in woodbase production, but industrially they are merely used as an admixture owing to the lack of moisture resistance, the relatively high cost and the long process times.

It is accordingly amino- and phenoplasts and also polymeric methylmethane diisocyanate (pMDI) which are of economic significance. The most important adhesive in the woodbase industry is the urea-formaldehyde adhesive (UF adhesive) together with the melamine-urea-formaldehyde adhesive (MUF adhesive). When the panels have to meet special moisture resistance requirements, it is phenol-formaldehyde adhesive (PF adhesive) and also PMDI which are preferred.

The adhesives with superior moisture resistance are distinctly more costly than the UF adhesives, so that blends of these adhesives are also frequently used. A combination of UF adhesive and MUF adhesive will also provide superior moisture resistance. The advantages of UF adhesive reside particularly in the easily performed chemical reaction and in the inexpensive raw materials. In addition, the cured adhesive is comparatively resistant to heat and exhibits very good adherence properties to wooden surfaces.

Amino- and phenoplasts cure via a condensation reaction. The disadvantages of these adhesives are that the condensation reaction requires an excess of formaldehyde, that not all the formaldehyde becomes attached, and that free formaldehyde is formed by hydrolytic scissioning of the adhesive. These mechanisms lead to an undesired emission of formaldehyde from the final woodbase materials. Furthermore, there are relatively strict regulations governing the allowable maximum level of free formaldehyde in the woodbase material and the allowable emissions of formaldehyde.

Various methods are known from the prior art for reducing formaldehyde emission from woodbase materials. In addition to reducing the molar ratio of formaldehyde to urea, replacing the formaldehyde and also modifying the formaldehyde, there is the possibility of binding the formaldehyde in the course of curing.

For example, formaldehyde may be at least partly replaced by some other substance, glyoxal for example, to thereby reduce the level of free formaldehyde. The further attempt is to modify urea-formaldehyde adhesives with organic functionalities or to add substances to the adhesive resin or adherends to bind the free formaldehyde.

DE 19704525 A1 discloses a method for the production of low-formaldehyde wood chip- and fiberboard panels. After the panels have been produced, they are treated with condensed tannins as formaldehyde scavengers. It is also possible to alter the production conditions, for example through specific techniques of curing and aftertreating woodbase materials, in order that the formaldehyde may escape more quickly from the materials.

However, these processes have disadvantages, for example to the effect that the mechanical and hygric properties, for example flexural strength and water resistance of the materials, are disadvantageously altered by the modification or addition of absorbents. The added substances can cause the reactivity to be changed, which results in an economically unfavorable lengthening of the usual press times. In addition, there is a risk that the effects achieved are only short-term measures, so that the emissions reach the same level after a certain time as without measures. The additionally introduced substances cannot themselves be resistant to moisture. On exposure to a corresponding stress and in the event of corresponding service conditions, therefore, the substances can accumulate on the panel surface and pass into the environment.

JP 10085585 A1 describes a substance for cleaning indoor air of volatile organic pollutants which consists of zeolites, alumina, kieselguhr or silica gel and bears amino groups on the surface of the material, enhancing the adsorption of formaldehyde in particular. It is also known from the prior art that zeolites contain ions of calcium, of sodium and of manganese. Volatile organic compounds (VOCs) are adsorbed on this material and decomposed catalytically.

In view of this prior art, the problem addressed by the present invention is that of providing a method for the production of woodbase materials and also woodbase products that have a sustained lower release of formaldehyde.

This problem is solved according to the invention by a method having steps of adding a zeolite to liqnocellulosic particles and subsequently mixing the lignocellulosic particles with formaldehydic adhesive and also by a woodbase product having the features of a finely powdered zeolite adhered to lignocellulosic particles which are contained in a mixture with formaldehydic adhesive. Dependent claims provide advantageous embodiments and refinements of the invention.

In the method of the invention for producing woodbase products from lignocellulosic particles and formaldehydic adhesives, which are mixed together and subsequently subjected to a shaping process, a zeolite is added to the mixture of lignocellulosic particles and adhesive. Arranging a zeolite in the woodbase product makes it possible to effect a sustained attachment or a catalytic degradation of the liberated formaldehyde in a woodbase material. The zeolite becomes embedded and permanently retained in the mixture of lignocellulosic particles and adhesive, so that the adsorption of the liberated formaldehyde or catalytic decomposition of the formaldehyde can be effected for a prolonged period. Owing to the possibility that formaldehyde can become covalently bonded to the amino groups on the zeolite surface and, on the other hand, the formaldehyde molecule can also become adsorbed in the pores of the zeolite owing to the large internal surface area thereof, there is an increased adsorptive capacity compared with systems where only one of the two mechanisms described above occurs.

Owing to the high efficaciousness of the zeolite in respect of the adsorption of formaldehyde or catalytic decomposition, it is preferable to set the zeolite content between 0.5 and 10 mass percent preferably between 2 and 6 mass percent based on the dry mass of lignocellulosic particles. Owing to the small amount of zeolites used, the mechanical and chemical properties of the woodbase material remain virtually unchanged. A chamber test of the zeolite's formaldehyde uptake revealed that formaldehyde was reduced to 60% to 20% of the original amount. When a specifically modified zeolite was put to the same use, it was even the case that a reduction to less than 20% of the original amount was achieved. In either case, the mechanical or hygric properties of the woodbase material were not adversely affected.

One aspect of the invention is characterized in that the zeolite is added to the adhesive before the mixing with the lignocellulosic particles. This makes it possible to use finely pulverized zeolites which can be distributed in the woodbase material in a uniform manner. Finely pulverized materials are typically out of the question for use as adsorbents, since their addition or even the fines already present due to the wood increase adhesive requirements appreciably. Therefore, owing to the increased addition of adhesive, there would be a higher potential of free formaldehyde, so that the effect due to adsorption by the finely pulverized adsorbent would be more than canceled out. First mixing the zeolites with the adhesive and then mixing the mixture of adhesive and zeolite with the lignocellulosic particles surprisingly does not lead to higher quantities of adhesive being required.

Useful lignocellulosic particles in addition to fibers and chips also include organic non-wood particles from annual or perennial plants.

A refinement of the invention is characterized in that the zeolite is mixed with the lignocellulosic particles before the adhesive is added, and then the adhesive and optionally further components are added to the mixture of zeolite and lignocellulosic particles. Such an approach is possible particularly when only small amounts of zeolite are added, since separation is less likely with relatively small amounts.

It is likewise possible to mix with the zeolite only a portion of the lignocellulosic particles used for the method and to add the missing components in a separate mixing process. The lignocellulosic particle portion and the zeolite are for example mixed with some adhesive and cured, so that the zeolite forms a durable bond with the particles. Particles thus conditioned are subsequently admixed with other lignocellulosic particles not bonded to zeolite, mixed with an adhesive and then further processed in a shaping process. It is entirely possible for particles with zeolite attachment to be arranged in the end product layer- or regionwise only.

The need for higher add quantities of zeolite may result in a separation or an inadequate degree of commixing between the zeolites and the particles. The zeolite is advantageously bonded to the chip surface in these cases. Bonding agents can be added to the lignocellulosic particles and/or the zeolite in order to ensure better adherence of the zeolites to the chips. Useful bonding agents include customary hydrophobicizing paraffins or additional paraffins having a particularly high tendency to stick.

Adherence via paraffin is achieved on first mixing the lignocellulosic particles with the paraffin in finely divided form and then adding the zeolite likewise in a mixing operation. It is likewise possible first to mix the zeolite and the lignocellulosic particles and then to add paraffin. Likewise, the simultaneous addition of all components in one mixer is possible.

Adherence of the zeolite is also obtainable by using an adhesive. The adhesive may be the same adhesive as used for producing the woodbase product or some other adhesive. The orders in which the components are mixed can be varied in the same way as in the case of using paraffin. When adhesive is used for the purpose of better zeolite adherence, it is not necessary to use the entire amount of adhesive used for producing the woodbase product. On the contrary, initially only a portion of the adhesive or adhesives is mixed with the chips or particles and the zeolite and then the still missing components are added.

It is also possible to mix a portion of the adhesive with some or all of the lignocellulosic particles and to cure the mixture, by supplying thermal energy to it, before a further addition of components. The zeolites are then attached to the surfaces of the lignocellulosic particles in a particularly firm manner. Thereafter, the other components of the woodbase product are added and end-processed.

A woodbase product consisting of two or more layers need not contain zeolites or equal zeolite portions in all layers. It is likewise envisioned that zeolite portions in the outer layers and the center layer differ from each other. A similarly contemplated woodbase product contains an interlayer with a zeolite component, for example between a customary outer layer and the center layer. In this construction, an interlayer would contain the essential or entire zeolite portion.

The zeolite can be added as a powder or suspension, advantageously the zeolite used is zeolite beta, clinoptilolith and/or zeolite Y, and it is likewise possible to use modified zeolite Y additionally or alternatively. It can likewise be envisioned that the zeolite used comprises modified, actively catalytically acting zeolites of type Y which scission formaldehyde.

Owing to the high thermal and chemical stability of zeolites, they suffer no damage during the production process of the woodbase product, nor are their adsorption properties impaired. It is additionally advantageous that the zeolite is obtainable as a very fine powder. As a result, it can be added as a finely divided adsorbent material without the construction material properties of the woodbase product being negatively impacted. This also ensures that the formaldehyde is directly adsorbed at the source of the emission and does not escape from the woodbase product.

The present woodbase product comprising a mixture of lignocellulosic particles and a formaldehyde-containing adhesive is characterized in that the woodbase product contains a zeolite. The zeolite fraction can vary according to product characteristics, but preferably is between 0.5 and 10 mass percent, preferably 2 and 6 mass percent of the proportion of the overall mass of the woodbase product which is attributable to the lignocellulosic particles.

One possible embodiment is characterized in that the zeolite is attached to the lignocellulosic particles via an adhesion promoter, for example via paraffin or via an adhesive identical to or different than the adhesive used to produce the matrix for the woodbase product.

One possible embodiment is characterized in that the zeolite forms a layerwise or regionwise arrangement in the woodbase product, preferably in an interlayer or in an outside layer. The zeolite fraction in the individual regions or layers can differ in order that a particularly high adsorptive performance may be provided at places of particularly high release of formaldehyde.

It is advantageous that the zeolite is modifiable in various forms. When, for example, zeolite Y having an Si/Al ratio of 40 with hydrophobic properties is used, this will have a positive effect on the adsorption of formaldehyde. The zeolite has for example a pore diameter of 7.4 Å, which is sufficiently large to take up the formaldehyde molecules.

To additionally improve the formaldehyde uptake, the zeolite is surface modified with aminopropyl groups. The surface modification of the zeolite is attainable in various ways. For example, 100 g of zeolite powder can be stirred with 44 g of 3-aminopropyltriethoxysilane and 725 g of chloroform at room temperature overnight. The zeolite is filtered off, washed with chloroform and dried at about 90° C. for about 2 hours. The ratio of modified $SiO_4$ units to unmodified $Si/AlO_4$ units is 1:6.6. Other solvents are also suitable for effecting modification. Stirring 500 mg of a zeolite powder with 2.2 g of 3-aminopropyltriethoxysilane in 18 g of cyclohexane or toluene or methyl tert-butyl ether (MTBE) at room temperature overnight and filtering off the zeolite thus treated, washing it with the corresponding solvent and drying it at 90° C. for about 1 h, results in ratios of modified $SiO_4$ units to unmodified $Si/AlO_4$ units of 1:6.0 (cyclohexane) and 1:7.0 (MTBE).

Modifications without solvent are also known. The ratios of modified $SiO_4$ units to unmodified $Si/AlO_4$ units are 1:15.0 on adding 0.56 g of 3-aminopropyltriethoxysilane to 0.11 g of zeolite powder under air and 1:3.6 on adding 0.72 g of aminopropyltriethoxysilane to 1 g of zeolite powder under argon.

USE EXAMPLE

To produce a chipboard panel, sprucewood chips and urea-formaldehyde adhesive are mixed and subsequently the mixture is divided into parts. One part of the mixture is mixed with 4% (based on dry mass of chips) of aminopropyl-modified zeolite Y. The two mixtures are subsequently formed into a web, precompacted and hotpress compacted to the target density of 650 kg/m$^3$. Subsequent measurement of formaldehyde release to EN 717-1 gave a value of 0.16 ppm for the panel without zeolite and a value of 0.08 ppm for the zeolite-containing panel. Transverse tensile strength was 0.68 N/mm$^2$ for the zeolite-containing panel and 0.71 N/mm$^3$ for the zeolite-free panel. Standard deviation in both cases was in the region of 0.06 N/mm$^2$ per square millimeter.

In addition to the use as a panel, the woodbase product can also be formed into other shapes, for example into profiles or into a container shape.

The invention claimed is:

1. A method for producing woodbase products comprising the steps of:
    mixing zeolite, a durable bond forming adhesive, and a portion of lignocellulosic particles in a first mixture;
    curing said first mixture to form conditioned particles, wherein said zeolite is bonded to lignocellulosic particles by said durable bond forming adhesive;
    mixing said conditioned particles and a formaldehydic adhesive with other lignocellulosic particles not bonded to zeolite to form a second mixture, wherein said formaldehydic adhesive may be the same or different from said durable bond forming adhesive; and
    processing said second mixture in a shaping process.

2. The method according to claim 1, wherein a proportion of said zeolite added is between 0.5% and 10% by mass, based on a dry mass of all the lignocellulosic particles in a final woodbase product.

3. The method as recited in claim 2 wherein the proportion of zeolite added is between 2% and 6% by mass, based on the dry mass of lignocellulosic particles.

4. The method according to claim 1, wherein only a portion of all the lignocellulosic particles used is mixed with said zeolite and is arranged layerwise or regionwise in a final woodbase product.

5. The method according to claim 1, wherein said curing step includes the steps of heating or supplying thermal energy to cure said durable bond forming adhesive.

6. The method according to claim 1, wherein said zeolite is added as a suspension during mixing step of said first mixture.

7. The method according to claim 1, wherein said zeolite is selected from the group consisting of zeolite beta, clinoptilolith, zeolite Y and modified zeolite Y.

8. The method according to claim 1, wherein said zeolite comprises modified, actively catalytically acting zeolites of type Y which scission or durably bind formaldehyde.

9. The method as recited in claim 1 further comprising the step of adding at least one adhesion promoter to one or more of said zeolite and said portion of lignocellulosic particles for improved adherence of said zeolite to the lignocellulosic particles in said portion of lignocellulosic particles.

10. The method according to claim 9, wherein said at least one adhesion promoter is selected from the group consisting of adhesives and paraffins.

11. The method as recited in claim 1 wherein said durable bond forming adhesive and said formaldehydic adhesive are the same.

12. A method for producing woodbase products, comprising the steps of:
    bonding zeolite to lignocellulosic particles with a first adhesive; and
    supplying thermal energy or heat to provide a curing process to form conditioned particles; and
    forming a woodbase product from said conditioned particles and a second adhesive which is different from said first adhesive and which is a formaldehydic adhesive, said forming step including bonding said conditioned particles together with said second adhesive.

13. The method as recited in claim 12 further comprising the step of adding at least one adhesion promoter to one or more of said zeolite and said lignocellulosic particles for improved adherence of said zeolite to said lignocellulosic particles.

14. The method as recited in claim 13 wherein said at least one adhesion promoter is selected from the group consisting of adhesives and paraffins.

15. The method according to claim 12, wherein a proportion of zeolite bonded is between 0.5 and 10% by mass, based on a dry mass of the lignocellulosic particles.

16. The method as recited in claim 15 wherein the proportion of zeolite bonded is between 2% and 6% by mass, based on the dry mass of lignocellulosic particles.

17. The method according to claim 12, wherein only a portion of all said lignocellulosic particles used is mixed with said zeolite, and said forming step includes arranging said conditioned particles and lignocellulosic particles layerwise or regionwise in a mixture which is bonded in said forming step.

18. The method according to claim 12, wherein said forming step includes heating to cure said second adhesive and a shaping process.

19. The method according to claim 12, wherein zeolite is provided as a suspension in said bonding step.

20. The method according to claim 12, wherein zeolite is selected from the group consisting of zeolite beta, clinoptilolith, zeolite Y and modified zeolite Y.

21. The method according to claim 12, wherein said zeolite comprises modified, actively catalytically acting zeolites of type Y which scission or durably bind formaldehyde.

* * * * *